Patented Dec. 28, 1948

2,457,600

UNITED STATES PATENT OFFICE 2,457,600

LINOLEUM SURFACE COVERING

Paul O. Powers, Manheim Township, Lancaster County, Pa., assignor to Armstrong Cork Company, Lancaster, Pa., a corporation of Pennsylvania No Drawing. Application November 2, 1944, Serial No. 561,636

10 Claims. (Cl. 260—13)

This application is a continuation in part of application, Serial No. 409,654, filed September 5, 1941, now abandoned and entitled Linoleum composition.

This invention relates to linoleum surface coverings and more particularly to linoleum covering for walls, desk top, counters, and other uses where foot traffic is not encountered.

An object of the invention is to provide a linoleum surface covering which may be used as finally consolidated into a sheet without the usual curing or maturing operation.

Another object of the invention is to provide a linoleum binder which may be incorporated with fillers to produce a linoleum surface covering requiring no maturing prior to installation and use.

According to my invention, the usual siccative oil-resin gel cement of linoleum is compounded with a limited quantity of a reinforcing agent, formed of a cellulose ether which is miscible with the linoleum cement and a modifying resin for the cellulose ether which is likewise miscible with the linoleum cement, is hard, and has a melting point in the range above 100° C., to produce a linoleum binder.

When fillers and pigments are incorporated into this binder and the mix is calendered into a sheet, a linoleum surface covering is produced which is ready for use, is tough and flexible and well suited for wall coverings, table and counter top coverings, decorative coverings for display counters and cases and objects such as waste baskets, cigarette boxes, and the like. The product is readily deformable about relatively small curvatures without breaking, making it ideally suited for such purposes. One of the major problems incident to curing or maturing is obviated—yellowing due to the heat curing which is particularly objectionable with wall and similar surface coverings where light or pastel shades are commonly used. The necessity for a relatively substantial backing may be eliminated, for it is not necessary to hang the sheets as is customary in stoving or curing. The expense of performing the curing operation is also eliminated.

Any of the siccative oil-resin gel cements useable in linoleum manufacture may be employed in the present invention. Such cements are well known and contain a thickened or bodied drying or semi-drying oil, referred to as a siccative oil, and a resin. The bodying or thickening is accomplished by polymerization induced by heat, by an oxidation process, or both by heat and oxidation. There are various well known ways of preparing the polymerizate used in the manufacture of linoleum. It can be obtained by simply heating the siccative oil to a high temperature, in the order of 500° F., for a number of hours, generally 12 hours or longer. The resulting product is known as "Taylor oil." The preparation of this product is described in British Patent No. 2057/1871. Polymerization can also be obtained by exposing the oil to air to effect both polymerization and oxidation. When the oxidation and polymerization are effected by trickling the oil over hanging sheets of scrim cloth, the product is known as "scrim or shed oil." Such a process is disclosed in British Patents 209/1860 and 1037/1863 to Frederick Walton, the inventor of linoleum. When the oil is prepared by blowing air through a quantity of oil in an oxidizer the product is known as "mechanical oil." A process of this sort is disclosed in British Patent 7742/1893 to Wood-Bedford and is sometimes referred to as the Wood-Bedford process. In all of these processes a semisolid plastic mass or siccative oil gel results. It is common practice to incorporate with the shed oil or the mechanical oil or a mixture of both shed and mechanical oil a resin which enhances the binding value of the cement. The siccative oil gel is generally charged with the resin into a heated mixer and incorporation of the resin with the siccative oil gel is effected to produce a siccative oil-resin gel.

Another method which is employed and the one which I prefer to use is to charge the siccative oil and resin into a mechanical oxidizer and effect polymerization and oxidation of the oil in the presence of the resin.

All of these siccative oil-resin cements are siccative oil-resin gels and are so termed, regardless of when or how the resin is incorporated with the oil.

The resin which is employed in the formation of the siccative oil-resin gel may be any naturally occurring resin, fossil resin, synthetic resin, or combination of such resins. Rosin, ester gum, kauri gum, copal, alkyd resin, rosin modified phenol-aldehyde resin, and the like, or mixtures thereof may be used. Rosin is at the present time the most widely used resin and, as mentioned above I prefer to incorporate the rosin with the siccative oil in the oxidizer.

Ordinarily, linoleum cements comprise about 65% to about 85% by weight of siccative oil and about 15% to about 35% by weight of resin. The oil most commonly used is linseed oil, but other oils such as soya bean oil, menhaden oil, Perilla oil, rapeseed oil, China-wood oil, and the like, or mixtures may be used.

The linoleum composition is prepared by admixing the siccative oil-resin gel cement with fillers such as cork, wood flour, and the like, together with color pigments. The product is consolidated as a wear layer upon a backing of burlap or saturated felt and is then transferred to a curing oven where heat is applied for a number of days in order to effect final curing or maturing of the wear layer. This operation is essential in linoleum manufacture to produce a product having the desired toughness, flexibility, and wear-resistance.

According to the present invention, a covering of linoleum type is prepared which requires no maturing or stoving. The product is characterized by a uniform degree of hardness, flexibility, and wear-resistance. It is obtained by adding to the siccative oil-resin gel cement a reinforcing agent which comprises cellulose ether, such as ethyl cellulose, methyl cellulose, benzyl cellulose, and the like, preferably of relatively high viscosity, and a hard, high melting point resin modifier for the cellulose ether.

The cellulose ether must be miscible with the siccative oil-resin gel cement. It has been determined that cellulose ethers, such as ethyl cellulose, having an ethoxy content between 43% and 50% are particularly suited for the present purpose for they are soluble in the siccative oil-resin gel. Ethyl cellulose is a particularly advantageous reinforcing agent, for the final product exhibits an unusual degree of toughness and has extremely good flexibility.

The use of cellulose ether alone as the reinforcing agent is not satisfactory for non-maturing coverings, but must be modified with the hard, high melting point resin, and also, the resin must be soluble in the siccative oil-resin gel. Those which are not so soluble should not be used, for they do not give the desired end product.

A condensation product of phenol and formaldehyde may be used, or a rosin modified maleic anhydride resin will be acceptable. High molecular weight hydrocarbon resins such as the high molecular weight polyindenes, polycoumarones, polystyrenes, and the like may be employed. Rosin modified phenol aldehyde resins have been found to give particularly good results. All are soluble in a miscible with the siccative oil-resin gel.

A cellulose ether or a mixture of cellulose ethers is modified with one or more of the hard, high melting point resins, preferably by blending the cellulose ether and resin prior to incorporation into the siccative oil-resin gel cement. This permits more ready incorporation, but it is not essential for the cellulose ether and resin may be added directly to the cement without prior blending.

It has been determined that the hard, high melting point resins which are used to modify the cellulose ether should possess a melting point at temperatures above about 100° C. For practical purposes, it is preferred to use a resin or mixture of resins having a melting point between about 100° C. and about 160° C.

The cellulose ether-resin reinforcing agent should constitute about 20% by weight to about 45% by weight of the total binder composition. When less than 20% of such reinforcing agent is used, the product will require maturing in order to produce a satisfactory covering. The use of more than 45% is not advantageous because the final product will be unusually hard and brittle and cannot be conveniently applied to curved surfaces of small radius.

A linoleum binder which has been found particularly good is prepared by the addition of about 20% by weight to about 25% by weight of the cellulose ether-resin reinforcing agent to a linoleum cement consisting of about 65% to 85% of siccative oil-resin gel and 35% to 15% resin.

The cellulose ether-resin reinforcing agent, prior to incorporation with the siccative oil-resin gel cement, should be free of any solvent or plasticizer which would act upon the reinforcing agent. The reinforcing agent should contain about 33% to about 67% by weight of cellulose ether and from about 67% to about 33% of resin.

The binder may be prepared by agitating a mixture of siccative oil-resin gel cement with the cellulose ether-resin reinforcing agent at temperatures between about 200° F. and about 250° F. This may be accomplished in a mixer, but milling rolls are preferred, for they insure a good distribution of the ingredients and rapid incorporation may be effected.

The following specific examples illustrate various linoleum binders suitable for use in the preparation of the surface coverings of the present invention when compounded with fillers and/or pigments and formed into a sheet with or without a backing. In the examples which are given by way of illustration and not limitation, the cement is in each instance a siccative oil-resin gel containing from about 65% to about 85% by weight of siccative oil and about 35% by weight to about 15% by weight of resin. The process of formation of the siccative oil resin gel is indicated in each instance.

*Example I*

| | Per cent |
|---|---|
| Mechanical oil cement | 75 |
| Ethyl cellulose | 15 |
| Rosin modified phenol aldehyde resin (150° C. melting point) | 10 |

*Example II*

| | Per cent |
|---|---|
| Shed and mechanical oil cement | 80 |
| Ethyl cellulose | 8 |
| Rosin modified phenol aldehyde resin (150° C. melting point) | 12 |

*Example III*

| | Per cent |
|---|---|
| Mechanical oil cement (resin incorporated with the oil prior to oxidation | 80 |
| Ethyl cellulose | 10 |
| Coumarone indene resin (125° C. melting point) | 10 |

*Example IV*

| | Per cent |
|---|---|
| Taylor oil cement | 54.8 |
| Benzyl cellulose | 20.0 |
| Rosin—maleic glyceride (125° C. melting point) | 25.0 |
| Hydroquinone (anti-oxidant) | .2 |

*Example V*

| | Per cent |
|---|---|
| Shed and mechanical oil cement | 70 |
| Ethyl cellulose | 20 |
| Polystyrene (120° C. melting point) | 10 |

*Example VI*

| | Per cent |
|---|---|
| Mechanical oil cement (oil and resin combined prior to oxidation) | 60 |
| Ethyl cellulose | 10 |
| Rosin modified phenol formaldehyde (110–120° C. melting point) | 30 |

It will be understood that the above examples are merely to illustrate the invention and that the proportions may be varied as indicated above. The specific ingredients employed may be other than those enumerated.

It is desirable in some instances to incorporate a small amount of an inhibitor or anti-oxidant. The incorporation of such material overcomes any tendency for the final product to become too hard and brittle during storage. Any of the well known anti-oxidants may be used. Such materials as oxalic acid; polyhydric phenols, such as hydroquinone; the di-aryl amines, for example, di-phenyl amine; and the like may be employed. The anti-oxidants are added in relatively small amounts, generally in the neighborhood of 5% or less by weight, based on the weight of the siccative oil-resin gel cement. The use of anti-oxidants is particularly desirable where Taylor oil cement is used.

While I have described certain preferred embodiments in my invention, it will be understood that the invention is not limited to such embodiments but may be otherwise practiced within the scope of the following claims.

I claim:

1. A finished wall or similar surface covering of linoleum type suitable for use as consolidated and without maturing or similar treatment comprising a filler and a binder, said binder comprising about 55% to about 80% of a non-matured siccative oil-resin linoleum cement in which the oil is oxidized to a semi-solid gel including from about 65% to about 85% by weight of siccative oil and from about 35% to about 15% by weight of resin; and about 45% to about 20% of a reinforcing agent for said siccative oil-resin cement, said reinforcing agent including about 33% to about 67% of a cellulose ether soluble in said siccative oil-resin cement and selected from the group consisting of methyl cellulose, ethyl cellulose, and benzyl cellulose and from about 67% to about 33% of a hard, high melting point resin soluble in said siccative oil-resin cement and having a melting point between about 100° C. and 160° C.

2. A finished wall or similar surface covering of linoleum type suitable for use as consolidated and without maturing or similar treatment comprising a filler and binder, said binder comprising about 55% to about 80% of a non-matured siccative oil-resin linoleum cement in which the oil is oxidized to a semi-solid gel, said cement including from about 65% to about 85% by weight of siccative oil and from about 35% to about 15% by weight of resin; and about 45% to about 20% of a reinforcing agent for said siccative oil-resin cement, said reinforcing agent including 33% to 67% of a cellulose ether soluble in said siccative oil-resin cement and selected from the group consisting of methyl cellulose, ethyl cellulose, and benzyl cellulose, and about 67% to about 33% of a hard, high melting point resin soluble in said siccative oil-resin cement and having a melting point above about 100° C.

3. A finished wall or similar surface covering of the linoleum type, suitable for use as consolidated and without maturing or similar treatment in accordance with claim 2 in which the cellulose ether is ethyl cellulose.

4. A finished wall or similar surface covering of the linoleum type suitable for use as consolidated and without maturing or similar treatment in accordance with claim 2 in which the cellulose ether is methyl cellulose.

5. A finished wall or similar surface covering of the linoleum type suitable for use as consolidated and without maturing or similar treatment in accordance with claim 2 in which the cellulose ether is benzyl cellulose.

6. A finished wall or similar surface covering of linoleum type suitable for use as consolidated and without maturing or similar treatment in accordance with claim 2 in which the hard, high melting point resin is a rosin modified phenol aldehyde resin.

7. A finished wall or similar surface covering of the linoleum type suitable for use as consolidated and without maturing or similar treatment in accordance with claim 2 in which the hard, high melting point resin is coumarone indene resin.

8. A finished wall or similar surface covering of the linoleum type suitable for use as consolidated and without maturing or similar treatment in accordance with claim 2 in which the hard, high melting point resin is polystyrene.

9. A finished wall or similar surface covering of the linoleum type suitable for use as consolidated and without maturing or similar treatment comprising a filler and a binder, said binder including about 55% to about 80% of a non-matured siccative oil-resin linoleum cement in which the oil is substantially completely oxidized in the presence of the resin and the cement is in the form of a semi-solid oil-resin gel, including from about 65% to about 85% of siccative oil and from about 35% to about 15% of resin and an anti-oxidant for the siccative oil-resin cement, and about 45% to about 20% of a reinforcing agent for said siccative oil-resin cement, said reinforcing agent including 33% to 67% of a cellulose ether soluble in said siccative oil-resin cement and selected from the group consisting of methyl cellulose, ethyl cellulose, and benzyl cellulose, and from about 67% to about 33% of a hard, high melting point resin soluble in said siccative oil-resin cement and having a melting point between about 100° C. and 160° C.

10. A finished wall or similar surface covering of the linoleum type suitable for use as consolidated and without maturing or similar treatment in accordance with claim 9 in which the anti-oxidant is present in an amount less than 5% based on the weight of the siccative oil-resin cement.

PAUL O. POWERS.

REFERENCES CITED

The following references are of record in the file of this patent:

UNITED STATES PATENTS

| Number | Name | Date |
| --- | --- | --- |
| 2,148,601 | Bucy | Feb. 28, 1939 |